United States Patent [19]
Ingels

[15] 3,655,172
[45] Apr. 11, 1972

[54] SATURATED FLUID MIXTURES GENERATOR

[72] Inventor: Glenn R. Ingels, 11607 Windy Lane, Houston, Tex. 77024

[22] Filed: Apr. 14, 1970

[21] Appl. No.: 28,192

Related U.S. Application Data

[63] Continuation of Ser. No. 719,613, Apr. 8, 1968, abandoned, which is a continuation-in-part of Ser. No. 604,515, Nov. 28, 1966, abandoned, which is a continuation-in-part of Ser. No. 292,280, July 2, 1963, abandoned.

[52] U.S. Cl. ..........................261/130, 23/282, 148/16, 148/16.5, 148/20.3, 252/373, 261/121 R, 261/130, 261/151, 261/153
[51] Int. Cl. ......................................C02d 1/00, C02d 1/04
[58] Field of Search ...............23/281, 282, 285; 48/197, 210; 210/59, 63; 261/151, 153, 121, 130, 131, 122–124

[56] References Cited

UNITED STATES PATENTS

| | | | |
|---|---|---|---|
| 977,907 | 12/1910 | Temple | 261/94 X |
| 1,885,012 | 10/1932 | Harvey | 23/285 X |
| 2,085,597 | 6/1937 | Marshall | 148/16 |
| 2,294,460 | 9/1942 | Jones | 261/121 X |
| 2,934,330 | 4/1960 | Rusciano et al. | 148/16 X |
| 2,980,522 | 4/1961 | Dille et al. | 48/196 |

OTHER PUBLICATIONS

Bullens, D K., Steel and Its Heat Treatment, Vol. II, 5th Ed., p. 130–132, 141, 142, 147, 148 (1948), J. Wiley & Sons, N.Y.

*Primary Examiner*—Joseph Scovronek
*Attorney*—James F. Weiler, Jefferson D. Giller, William A. Stout, Paul L. DeVerter, II, Dudley R. Dobie, Jr. and Henry W. Hope

[57] ABSTRACT

A generator for generating a saturated fluid mixture under close temperature and pressure control including a chamber, means for introducing liquid water into the chamber and means for introducing into the chamber and into intimate contact with the water, gases from a source means selected from the group consisting of oxidizing and reducing gases for providing in the liquid water a mixture of carbon dioxide, hydrogen and carbon monoxide, and oxidizing and carburizing gases for providing in the liquid water a mixture of carbon dioxide, methane, hydrogen and carbon monoxide. Temperature control means are provided for maintaining the temperature of the water at each control point temperature from about 32° F. to about 160° F., and pressure regulator means are provided for maintaining the pressure on any given gas mixture pressures from atmospheric up to 218.5 atmospheres so that the saturated fluid mixture is generated.

The chamber includes outlet means for discharge of the generated saturated fluid mixture which is arranged so that the generated saturated liquid mixture retains its properties upon discharge from the chamber so that it can be used to treat metallic and nonmetallic materials to alter their properties. Several embodiments of the generator are shown and described and a number of examples are set forth.

7 Claims, 3 Drawing Figures

Patented April 11, 1972  3,655,172

WATER - GAS GENERATOR

WATER - GAS GENERATOR

Glenn R. Ingels
INVENTOR.

BY James F Weiler
Jefferson D Giller
Paul L DeVerter II
Dudley R Dobie, Jr
ATTORNEYS

SATURATED FLUID MIXTURES GENERATOR

CROSS REFERENCE TO RELATED APPLICATIONS

The present application is a streamline continuation of Ser. No. 719,613, filed Apr. 8, 1968, now abandoned, which in turn is a continuation-in-part of application Ser. No. 604,515, filed Nov. 28, 1966, which, in turn, is a continuation-in-part of application Ser. No. 292,280, filed July 2, 1963, both of which are now abandoned in favor of this application. Restriction was required in application Ser. No. 292,280. Continuation-in-part application Ser. No. 597,290 filed Nov. 28, 1966, now abandoned in favor of its continuation-in-part application Ser. No. 833,308, now U. S. Pat. No. 3,539,165; and continuation-in-part application Ser. No. 597,291, filed Nov. 28, 1966, now abandoned in favor of its continuation in part application Ser. No. 828,600 filed May 28, 1969, include claims to the other inventions disclosed in application Ser. No. 292,280.

BACKGROUND OF THE INVENTION

The present invention relates to saturated fluid mixtures and their generation, which saturated fluid mixtures are useful as an environment in the melting, heat treating, welding, cold-treating, casting, surface treating, and the like of metallic and non-metallic materials by which desired properties in the materials are obtained.

It has long been desired in the art to produce a furnace atmosphere that is in equilibrium, that is, one that would be "-neutral" to metallic or non-metallic bodies at any given temperature. For example, in the heat treating of steel the problem of scaling, decarburizing and carburizing is always present in the higher temperature ranges and discoloration, scaling, decarburizing and the like is always present in the lower temperature ranges. Prior to the present development there were no equilibrium balanced saturated fluid mixtures in the metallurgical art and generators or methods for generating them, which generated saturated fluid mixtures were neutral to metallic and non-metallic bodies at given temperatures. Before the present development, furnace atmospheres attempted to solve this problem by maintaining a condition whereby the components of the atmospheric gas were both carburizing and decarburizing at equal rates resulting in very little change in the surface condition of the steel. This has not been entirely satisfactory. For example, one difficulty is that the rates at which the carburizing and decarburizing reaction takes place change with a change of furnace temperature which results in either a carburized or decarburized condition.

Also, in the metallurgical art before the present development, there was no furnace atmosphere for treating metals and non-metals which by simply controlling temperature and pressure of the atmosphere during its generation and transportation to the treating zone is neutral, oxidizing and decarburizing, oxidizing and carburizing, reducing and carburizing or reducing and decarburizing so that desired properties can be imparted to these metals and non-metals.

The present invention is directed to such saturated fluid mixtures and to methods of and apparatus for producing them.

SUMMARY

The present invention relates to saturated fluid mixtures useful as an environment in the melting, heat treating, welding, cold treating, casting, surface treating, and the like of metallic and non-metallic bodies by which desired properties in the body are obtained and methods of and apparatus for generating them.

More particularly, the present invention relates to a fluid mixture comprising liquid water saturated with a major amount of carbon dioxide, a minor amount of methane and lesser amounts of hydrogen and carbon monoxide and to apparatus for and methods for saturating liquid water with gases providing these components while maintaining the liquid water in the temperature range of from about 32° F. to about 160° F. and while maintaining these gases at pressures from ambient atmospheric up to the critical pressure of water, which is 218.5 atmospheres. These generated saturated fluid mixtures may be in equilibrium or neutral, may be oxidizing and decarburizing, may be oxidizing and carburizing, may be reducing and carburizing, or may be reducing and decarburizing by controlling the temperatures and pressures within the ranges mentioned during generation. These generated saturated fluid mixtures are useful as an environment in the melting, heat treating, welding, cold treating, casting, surface treating and the like of metals and non-metals by which desired properties in them are obtained. These metals include all of the elements of the Periodic Table and the non-metals include the oxides, sulfides, sulphates, silicates, phosphates and carbonates of the elements of the Periodic Table.

The generated saturated fluid mixtures are discharged from the generator system in a controlled manner so that their generated characteristics and properties are substantially maintained and so that they can be transported in this condition to a treatment zone for treatment of these metals and non-metals.

It would be highly advantageous, and it is therefore an object of the present invention, to provide saturated fluid mixtures, which by control of temperatures and pressures during their generation have a variety of properties useful for treating metals and non-metals for imparting desired properties in them.

A further object of the present invention is the provision of generators for and methods of producing such saturated fluid mixtures.

It is an object of the present invention to provide fluid mixtures in which liquid water is saturated with high or major concentrations of carbon dioxide, minor amounts of methane and lesser amounts of hydrogen and carbon monoxide and to apparatus for and methods of generating them.

A further object of the present invention is the provision of an atmosphere and apparatus for and methods of producing it which by control of temperature and pressure within the ranges herein set forth can be used for treating metallic and non-metallic materials, and which has the characteristics or properties of being in equilibrium or neutral, oxidizing and decarburizing, oxidizing and carburizing, reducing and carburizing or reducing and decarburizing.

Yet a further object of the present invention is the provision of generated saturated fluid mixtures and apparatus for and methods of generating them which are useful in treating metallic and non-metallic bodies by which new and advantageous properties are obtained in these bodies.

A still further object of the present invention, is the provision of generated saturated fluid mixtures and apparatus for and methods of generating them which are useful as an environment in processing metallic and non-metallic bodies, such as in annealing, normalizing, hardening, tempering, carburizing, nitriding, surface coating, freezing, cold treating, welding, casting and the like, by which improved results are obtained.

Other and further objects, features and advantages of the invention will be apparent from the following description of presently preferred embodiments of the invention, given for purpose of disclosure.

DESCRIPTION OF THE PREFERRED EMBODIMENTS

Figure 1:
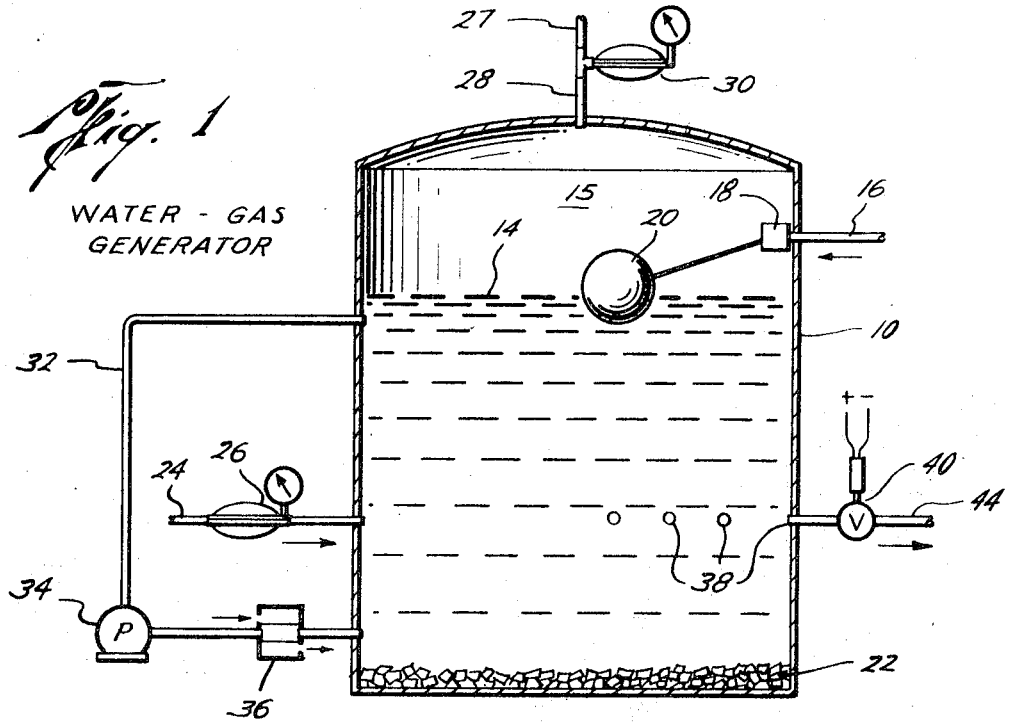
FIG. 1 is an elevational view, partly in section, illustrating a generator according to the invention, for generating the saturated fluid mixture of the invention and useful in the method of the invention.

The generated saturated fluid mixture comprises liquid water saturated with a major amount of carbon dioxide, a minor amount of methane and lesser amounts of hydrogen and carbon monoxide. Other components may be present. This is accomplished by saturating liquid water, while it is maintained at a temperature of from about 32° F. to about 160° F. while the gases are maintained from atmospheric pressure up to the critical or equilibrium pressure of water. The carbon dioxide or the liquid water may comprise the largest percentage by volume of the generated fluid mixture. The generated fluid mixture composition has relatively low or minor amounts of hydrogen and carbon monoxide. Methane is present in minor amounts; although, there is more methane present than either hydrogen or carbon monoxide.

The methods of the invention for preparing the saturated fluid mixture of the invention comprise saturating liquid water while maintaining it in the temperature range of about 32° F. to about 160° F. and under pressures up to the equilibrium pressure of water, which is 218.5 atmospheres. A preferred temperature of the liquid water is within the range from 105° F. to 140° F. with a constant pressure of the gases in the range of 25 to 80 psia. Particularly good results have been obtained by maintaining the liquid water at a temperature of the order of about 120° F. with a constant gas pressure of the order of about 28 to 60 psia.

The gases which may be used to saturate the liquid water may be any combination of oxidizing and reducing or oxidizing and carburizing gases which will react to provide in liquid water, within the temperature and pressure ranges specified, a high saturation of the water with carbon dioxide with or without a minor amount of methane, and with lesser amounts of hydrogen and carbon monoxide. Suitable gases for this purpose are mixtures of carbon dioxide and hydrogen or carbon dioxide and methane, or methane and oxygen, with or without combustion, which are presently preferred. If desired, additional carbon may be provided to the water in the form of charcoal, coke, graphite and the like. This additional carbon may be omitted. By controlling temperatures and pressures within the ranges set forth liquid water saturated with these gases is produced, which may be in equilibrium or neutral, may be oxidizing and decarburizing, may be oxidizing and carburizing or may be reducing and decarburizing. It is essential, however, that the saturated fluid mixture generated by the process be maintained in essentially its generated condition and transported to a treatment zone for treatment of metallic and non-metallic materials in order to obtain the beneficial result of the present invention.

The metallic bodies subject to treatment by the generated saturated fluid mixture includes all of the elements of the Periodic Table and their alloys, for example, steel, stainless steel, tungsten, molybdenum, vanadium and the like. The non-metallic materials include the oxides, sulfides, sulphates, silicates, phosphates and carbonates of the elements of the Periodic Table.

Figure 3:
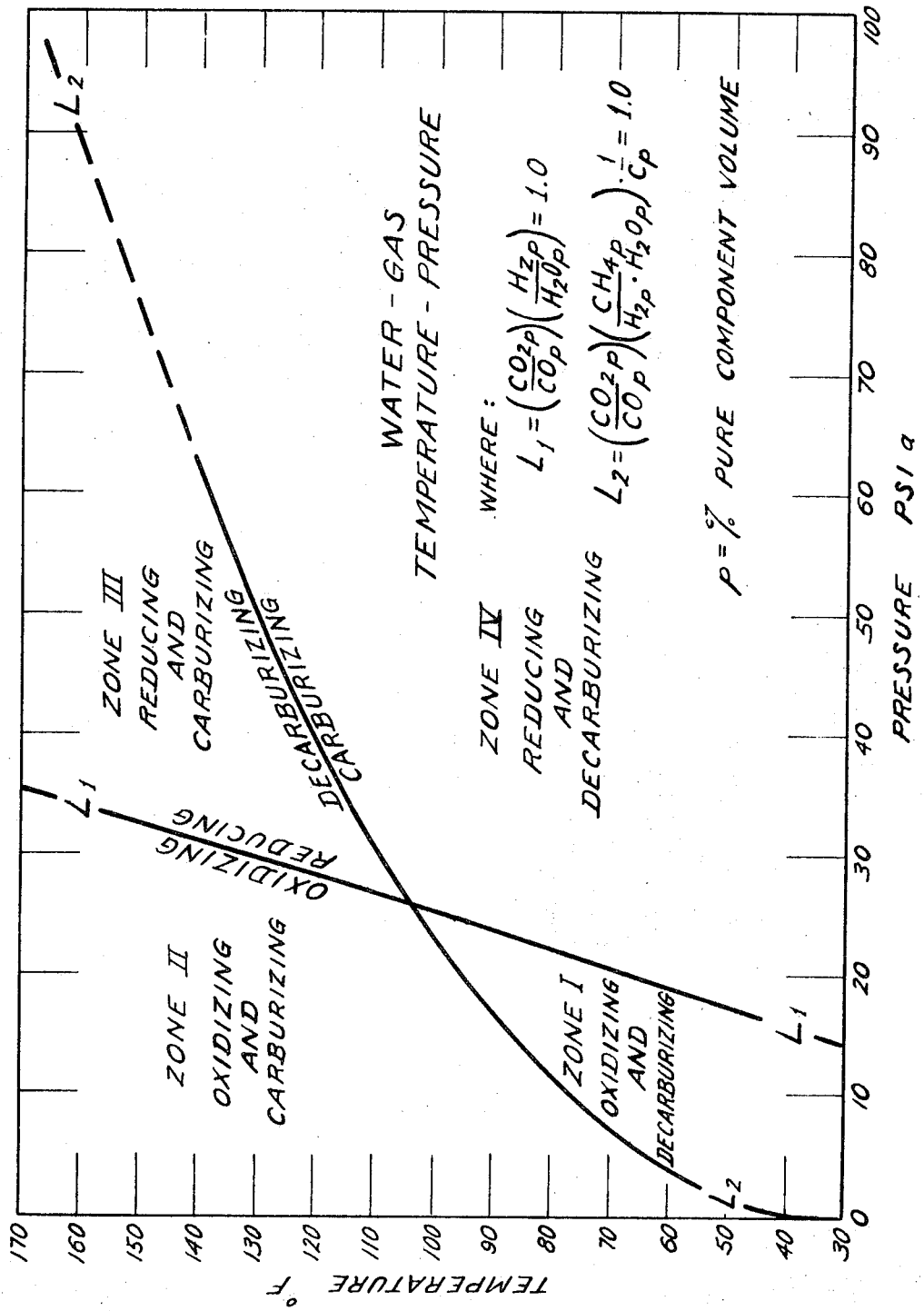

The effect of controlling the temperature and pressure on the properties or characteristics of the generated saturated fluid mixture is best illustrated in FIG. 3 to which reference is now made. For example, if the temperature of the liquid water is maintained at 50° F. and the pressure of the gases is maintained at 10 psia, the generated saturated fluid mixture would be in zone I and would have oxidizing and decarburizing properties. If the temperature of the liquid water were raised to 90° F., then the characteristics and properties of the generated saturated fluid mixture would fall within Zone II and be oxidizing and carburizing.

If the temperature of the water were maintained at 150° F. and the gases at a pressure of 45 psia, then the generated saturated fluid mixture would fall within Zone III and have the properties of reducing and carburizing. If the temperature of the water is reduced to 90° F. and the gases held at a pressure of 45 psia, the generated saturated fluid mixture would fall within Zone IV and would have the properties of reducing and decarburizing.

As further illustrated in FIG. 3, if the pressures and temperature are maintained so as to coincide with the curve $L_1$, the generated atmosphere is neither oxidizing nor reducing although it may be carburizing or decarburizing. Similarly, if the temperature and pressure are maintained so as to coincide with the curve $L_2$, then the generated saturated fluid mixture is neither decarburizing or carburizing. By proper control of temperature and pressure the generated saturated fluid mixture may be completely neutral or in equilibrium.

In practicing the methods of the invention, the apparatus of the invention may be used, as subsequently described, and the gases may be flowed under controlled pressure into a chamber into intimate contact with liquid water in the chamber maintained from 32° F. to 160° F. with a gas head above the upper level of the water maintained at a pressure up to the equilibrium or critical pressure of liquid water, which is 218.5 atmospheres. When the gases cease to flow into the chamber, the liquid water is saturated and this may be used as an indication of such saturation. A saturated fluid mixture according to the invention has thus been formed and may then be discharged from the chamber, care being taken to maintain the properties and characteristics of the formed saturated fluid mixture on discharge from the chamber and transfer to a treating zone or chamber.

The following tables illustrate generated saturated fluid mixtures in which liquid water is saturated at the temperatures and pressures set forth with carbon dioxide, carbon monoxide, hydrogen and with or without methane which were provided by mixtures of carbon dioxide and hydrogen, mixtures of carbon dioxide and methane, and mixtures of methane and oxygen. These tables indicate the percentage of the pure components by volume saturating the water at the temperatures and pressures indicated.

TABLE I

The temperature of the water was maintained at 41° F. and a constant pressure of the gases was maintained at 19.2 psia. The saturated fluid mixture had the following composition.

| Pure Component | Percentage By Volume |
|---|---|
| $CO_2$ | 62.58% |
| CO | 1.38% |
| $H_2$ | 0.90% |
| $CH_4$ | 2.11% |
| $H_2O$ | 33.03% |
| Total: | 100.00 |

This composition was reducing and decarburizing. By calculation $L_1=1.2$ and $L_2=3.2$

TABLE II

The temperature of the water was maintained at 41° F. but the pressure was increased to 44 psia. The saturated fluid mixture had the following composition.

| Pure Component | Percentage By Volume |
|---|---|
| $CO_2$ | 76.92% |
| CO | 1.70% |
| $H_2$ | 1.10% |
| $CH_4$ | 2.60% |
| $H_2O$ | 17.68% |
| Total: | 100.00 |

This saturated fluid mixture was reducing and decarburizing. By calculation $L_1=2.8$ and $L_2=6.05$

TABLE III

The temperature of the liquid water was maintained at 122° F. but the gas pressure was decreased to 19.2 psia. The saturated fluid mixture had the following composition.

| Pure Component | Percentage By Volume |
|---|---|
| $CO_2$ | 38.36% |
| CO | 1.42% |
| $H_2$ | 1.41% |
| $CH_4$ | 1.88% |
| $H_2O$ | 56.93% |
| Total: | 100.00 |

This saturated fluid mixture was oxidizing and carburizing. By calculation $L_1=0.67$ and $L_2=0.63$

TABLE IV

The temperature of the water was maintained at 122° F. and the pressure of the gases was raised to 44 psia. The generated saturated fluid mixture had the following composition.

| Pure Component | Percentage By Volume |
|---|---|
| $CO_2$ | 56.53% |
| CO | 2.09% |
| $H_2$ | 2.08% |
| $CH_4$ | 2.77% |
| $H_2O$ | 36.53% |
| Total: | 100.00 |

This saturated fluid mixture was reducing and slightly carburizing. By calculation $L_1=1.5$ and $L_2=0.986$

TABLE V

The temperature of the water was maintained at 41°F and the pressure was raised to a pressure of 218.5 atmospheres. The generated saturated fluid mixture had the following composition.

| Pure Component | Percentage By Volume |
|---|---|
| $CO_2$ | 93.16% |
| CO | 2.06% |
| $H_2$ | 1.34% |
| $CH_4$ | 3.14% |
| $H_2O$ | 0.30% |
| Total: | 100.00 |

This saturated fluid mixture was reducing and decarburizing. By calculation $L_1=202.0$ and $L_2=353.0$

TABLE VI

The pressure of the gas was maintained at 218.5 atmospheres and the temperature of the water was raised to and maintained at 122° F. This resulted in a saturated fluid mixture having the following composition.

| Pure Component | Percentage By Volume |
|---|---|
| $CO_2$ | 88.36% |
| CO | 3.27% |
|  | 3.26% |
| $CH_4$ | 4.32% |
| $H_2O$ | 0.79% |
| Total: | 100.00 |

This saturated fluid mixture was reducing and decarburizing. By calculation $L_1=113$ and $L_2=4.6$

TABLE VII

The following is a typical composition generated by a conventional endothermic generator in the art today.

| Pure Component | Percentage By Volume |
|---|---|
| $CO_2$ | 0.40% |
| CO | 19.60% |
| $H_2$ | 40.00% |
| $CH_4$ | 0.02% |
| $H_2O$ | .87% (dew point 43° F.) |
| $N_2$ | 38.93% |

Total: 99.82

It can be seen from the composition of this fluid mixture that it is very low in the water and water-forming constituents, carbon dioxide and methane. The composition is mainly carbon monoxide, hydrogen and nitrogen, which is strongly carburizing and decarburizing and not neutral, and which provides a very stable atmosphere which changes very little in pressure during changes in temperature and thereby does not follow the equilibrium curves $L_1$ and $L_2$ as shown by the graph in FIG. 3.

Referring now to the drawings, and particularly to FIG. 1, a generator according to the invention which produces saturated fluid mixtures according to the invention and useful in the methods of the invention is illustrated. The generator includes an insulated chamber 10 which is partially filled with liquid water 14 through the water inlet 16 connected to the chamber and controlled by the float valve 18 which is actuated by the liquid level float 20 floating on the surface of the liquid water 14.

The liquid water 14 is in intimate contact with a carbon material 22, here shown as hardwood charcoal, which is placed in the generator prior to starting operations for the purpose of stabilizing the oxidizing properties of carbon dioxide and water, and the reducing and carburizing properties of methane. If desired, the charcoal 22 may be eliminated or any desired carbon-containing material may be substituted for the charcoal, such as coke, graphite and the like. The desired gas mixtures are introduced into the chamber 10 by the flow line 24 and are regulated by the pressure regulator 26. Preferably the gas mixture input line 24 is connected to the chamber 10 below the level of the water 14 so that gas mixture is bubbled up through the water 14. Undissolved gases collect at the top of the chamber forming a head of gas pressure 15 and the undissolved gases are discharged through the discharge lines 27 and 28 connected at the top of the chamber 10 and controlled by the back pressure valve 30.

Means are provided for recirculating the water by the water recirculation line 32, the pump 34 and through the heat exchanger 36, which may be either for refrigeration or heating, so that the water within the container 10 may be maintained at any desired temperature between 32° F. and 160° F. It should be noted that the direction of circulation of the water in circulation line 32 may be in either direction, as desired.

One or more discharge lines 38 are connected to the container 10 below the upper level of the water 14 for discharge of the formed saturated fluid mixture, each of which discharge lines are provided with a flow control valve 40 and a line 44, only one of each being shown for illustration purposes, so that the saturated fluid mixture discharged from the generator 10 in discharge lines 38 can be transported to be suitable treatment zone, not shown, and maintained with its generated characteristics and properties. In this connection, the discharge outlets 38 should be of a sufficiently small diameter to retain the generated saturated fluid mixture essentially under the same pressure conditions as are existing in the chamber 10 during generation.

The controls illustrated in FIG. 1, as well as other controls, may be to maintain the temperature and pressure conditions desired, may be of any desired type, which controls are readily available, and accordingly, no detailed description is deemed necessary or given. It is important, however, that the sensing heads of each discharge valve be located in the discharge line near the chamber 10 so that the information obtained is at the discharge point from the chamber.

Figure 2:
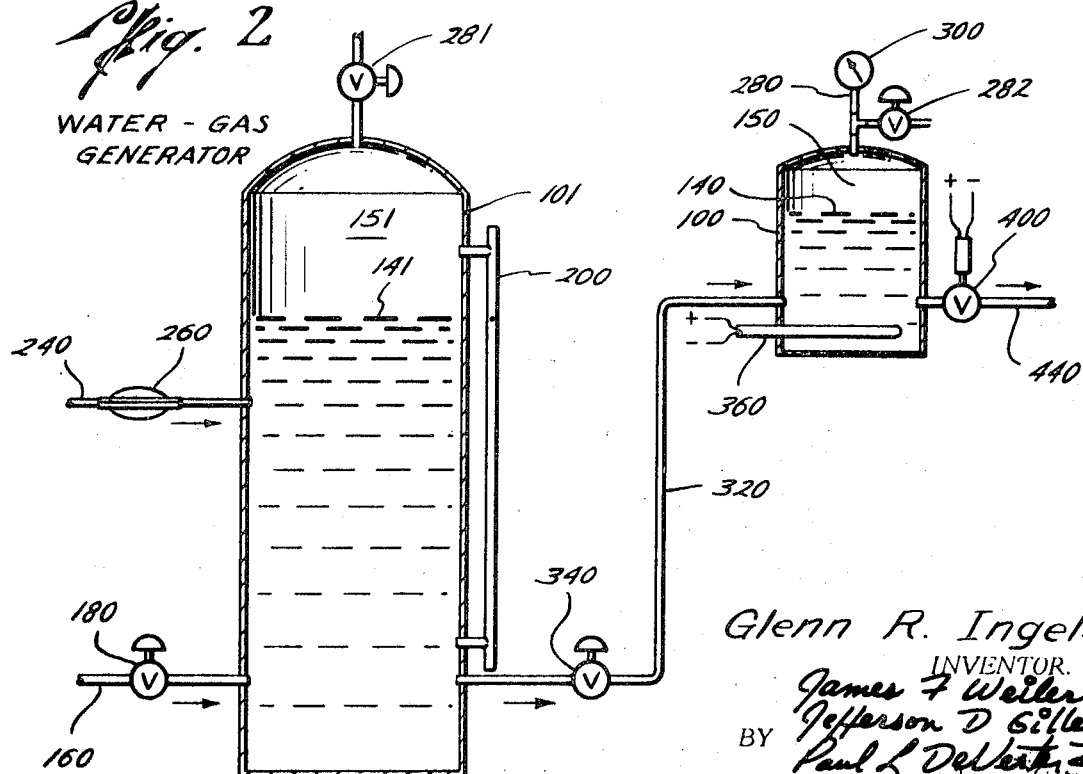
FIG. 2 is an elevational view, partly in section, of a modified generator according to the invention, for producing saturated fluid mixtures of the invention and useful in the method of the invention; and, FIG. 3 is a graph illustrating the equilibrium curves of saturated fluid mixtures according to the invention and illustrating temperature and pressure zones in which the saturated fluid mixtures are in equilibrium or neutral, oxidizing and decarburizing (zone I), oxidizing and carburizing (zone II), reducing and carburizing (zone III) and reducing and decarburizing (zone IV), which graph also sets forth equations for the equilibrium curves $L_1$ and $L_2$.

Referring now to FIG. 2, a modified generator according to the invention and useful in the methods of the invention and for generating atmospheres of the invention is illustrated which includes a generally cylindrical chamber 101 into which water is introduced through the line 160 and controlled by the shut-off valve 180. The gas-mixture input line 240, controlled by the pressure regulator 260, is connected to the chamber 101 so that the gas mixture introduced by the input line 240 bubbles up through the water 141 in the container 101. A back pressure bleed-off valve normally kept closed is provided and generally indicated by the reference 281 and is connected to the upper end of the chamber 101. The water 141 and pressure head of the gases 151 are thus provided in the chamber 101 and a liquid level sight glass 200 is provided for visual observations of the liquid water level in the chamber 101. A discharge line 320, controlled by the shut-off valve 340 is provided at the lower portion of the chamber 101 and transports the gas water mixture from the chamber 101 into the chamber 100 to provide the liquid water 140 therein and pressure head of the gases 150 at the upper portion of the chamber 100. The chamber 100 is generally cylindrical and may be of the same general configuration as that of the chamber 101.

A pressure line 280 is provided at the upper end of the chamber 100, provided with the pressure gauge 300 and controlled by the pressure regulator 260 through chamber 101 and 100 for controlling the pressure of the gaseous head 150 within the chamber 100 and the bleed-off valve 282 normally kept shut is for discharging unreacted or undissolved gases of the gaseous head 150 from the system when desired.

A heat exchanger coil 360 is provided in the lower portion of the chamber 100 within the liquid water 140 therein for controlling, that is heating, the water 140 to the desired temperature within the temperature range as previously mentioned. The chamber 100 is always kept at a higher temperature than 101. A saturated fluid mixture is generated whose composition is dependent on the gases, and additional carbon, if present, used to saturate the liquid water. The generated saturated fluid is discharged from the vessel 100 through the discharge line 440 connected to its lower portion and controlled by the flow control valve 400 activated by any means to control the flow of saturated fluid from the chamber 100.

As previously mentioned, all the control valves, pressure regulators, flow valves, sensers and the like are conventional, may be purchased commercially, and no detailed discussion thereof is deemed necessary or given and many have been omitted for clarity of description.

In connection with both of the embodiments of FIGS. 1 and 2, the suitable gas mixtures are provided to input line 24 (FIG. 1) and input line 240 (FIG. 2) from suitable sources and flow lines controlled by suitable regulators and control devices so that the desired gases under desired pressures are introduced by these lines into their respective chambers, 10 (FIG. 1) and 101 (FIG. 2).

In the operation of the generator of FIG. 1, suitable mixtures of gases are introduced into the chamber 10 by the common input line 24. These gases may be, for example, carbon dioxide and methane, which may, of course, be controlled by suitable pressure regulators, flow valves, differential regulators and the like. The introduced gas mixtures bubble up through the water 14 and form a pressure head 15 at the upper portion of the vessel 10. The pressure regulator 26 and the back pressure regulator 30 were adjusted to maintain a gas pressure head 15 of 19 psia without loss of gases through the discharge line 27. The flow control valve 40 on the discharge line 38 was closed at this time.

When there was no further flow of gases into the vessel 10 through the gas mixture input line 24, as indicated by flow meters, not shown, on the lines introducing the carbon dioxide and methane into the common input line 24, this was an indication that the liquid water 14 was saturated with these gases at 41° F. and 19 psia. The saturated fluid mixture was then discharged from the chamber 10 through one or more of the lines 38 by actuating the valve 40 for each line through which was desired.

Discharging the saturated fluid mixture through the discharge line 38 and transporting it to a treatment zone by the line 44 lowered the pressure at 15 since the level of the water 14 was lowered. The float 20 was lowered opening the float valve 18 thereby introducing more water into the chamber 10 through the water input line 16. The lowering of the level of the water 14 also lowered the pressure of the gas 15 and pressure regulator 26 then opened the gas input line 24 so that carbon dioxide and methane again bubbled up through the water 14 until the pressure in the gas head 15 was restored to its predetermined set level of 19 psia. These gases continued to be introduced into the chamber 10 and the water circulated to maintain it at the desired temperature of 41° F. until the flow of carbon dioxide and methane into the chamber 10 stopped again indicating that the water 14 within the chamber 10 was again saturated with these gases. The saturated fluid mixture being discharged through discharge line 38 by actuating the flow control valve 40 and was transported by the line 44 to a treatment zone, all as previously described.

In operation, the changes were smooth and free from abrupt or sudden changes from the control temperature of 41° F. and the controlled pressure of 19 psia.

As previously mentioned, the hardwood charcoal 22 was placed within the chamber 10 prior to starting the generator for the purpose of stabilizing the reaction between oxidizing properties of carbon dioxide and water and the reducing-carburizing properties of methane. The charcoal 22, however, may be omitted.

The saturated fluid mixture discharge in the discharge line 38 and transported in the line 44 was composed of liquid water saturated with a major portion of carbon dioxide, a minor amount of carbon monoxide, and lesser amounts of hydrogen and methane and was satisfactory for the purposes set forth. The pressure and temperature controls may be set for the desired pressures and temperatures within the ranges specified.

In the operation of the generator of FIG. 2, to which reference is now made, the chamber 101 and 100 are filled with liquid water through the water inlet line 160 by opening the valve 180, with bleed-off valve 281 at the upper end of the chamber 101 and bleed-off valve 282 at the upper end of chamber 100 being opened, valve 340 in line 320 being opened and discharge valve 400 in the discharge line 440 of container 100 being closed. When the chambers 101 and 100 are filled with water, as seen through the liquid level sight 200, the bleed-off valves 281 and 282 were closed and the water inlet valve 180 was closed. Suitable gases, such as carbon dioxide and methane, were introduced through gas mixture input line 240 and regulated by pressure regulator 260. Discharge valve 400 of the container 100 was then opened and water was discharged through the discharge line 440 until a gaseous pressure head 151 was formed above the level of the water 141 in chamber 101, as seen through the liquid level sight 200. The heat exchanger, here shown as a heater element 360, was set to heat and maintain the water 140 in the container 100 at a desired temperature, such as a temperature of 122° F. In heating the water 140 in the container 100, the water saturated with gases in the chamber 101 evolved a portion of the gases to form a gas head 150 which was indicated on the pressure gauge 300. The pressure regulator 260 controlling the introduction of the gases in input line 240 into the chamber 101 was adjusted until a desired pressure, such as 45 psia, was indicated on the pressure gauge 300. Again, when the flow of carbon dioxide and methane into the chamber 101 stopped, it was an indication that the water 140 in chamber 100 was saturated with these gases as previously mentioned.

The saturated liquid water was discharged through the discharge line 440 from the container 100 by activating the flow valve 400. This lowered the level of the water 141 in the chamber 101. When the level of the water 141 reached the lower end of the liquid level sight 200, the chamber 101 was refilled with water by closing the valve 340 in transport line 320 and shutting off the flow of carbon dioxide and methane into the gas input line 240 and by opening the water inlet valve 180 to allow water to enter chamber 101 through the inlet line 160. The bleed-off valve 281 was opened to permit bleeding off of the gaseous head 151. When the level of the water 141 reached the top of the sight gauge 200, the bleed-off valve 181 was closed and the water inlet valve 180 was closed. Carbon dioxide and methane was then again permitted to flow through the common input line 240 to the chamber 101 to again apply a pressure of 45 psia in the pressure head zone 151. The shut off valve 340 in the transport line 320 from the chamber 101 was then opened to apply controlled pressure to the chamber 100 by means of the gaseous head 151. The cycle was then repeated and the saturated fluid mixture according to the invention was discharged through the discharge line 440 by again activating the flow control valve 400.

During these runs the volume of the gaseous head 150 had a tendency to increase which was reduced by bleeding off some of the gases through the bleed-off valve 282, thereby maintaining sufficient saturated fluid in chamber 100 with 45 psia of the gaseous head 150 in the chamber 100.

If desired, hardwood charcoal may be provided in either or both of the chambers 101 and 100 of the generator of FIG. 2, as in FIG. 1, although this is unnecessary.

In both the generators of FIG. 1 and FIG. 2 any combination of gases may be introduced and the pressures of the gases and the temperatures of the liquid water may be maintained within the ranges specified.

The following examples are illustrative of the beneficial effects of treating metals and non-metals with the generated saturated fluid mixture.

EXAMPLE I

In this example the saturated fluid mixture of Table I was discharged from a generator, such as illustrated in FIGS. 1 and 2, through a controlling flow valve into the preheat zone of a retort furnace being controlled at a temperature of 1,700° F. In this example, the gas used in saturating the liquid water was carbon dioxide and methane. the saturated fluid mixture was flowed from the preheat zone into the treating zone of the furnace and out an exhaust in which was located a thermocouple to measure the heat content or energy level of the exhausting gases. Sufficient heat was applied to the saturated fluid mixture in the preheat zone to convert it from its liquid state into a gaseous state and to flow into the treating zone. The temperature of the exhaust gases were controlled by controlling the rate of flow of the saturated fluid mixture into the furnace and out its exhaust.

When the temperature of the gases exhausting from the treating zone generally maintained at a temperature of 1,700° F. was less than 500° F., the atmosphere within the treating zone was oxidizing and decarburizing. When the exhaust temperature was from about 500° F. to about 980° F. the atmosphere within the treating zone maintained at a temperature of 1,700° F. was reducing and decarburizing. On the addition of 1 to 1½ cfh of methane to the fluid mixture in the preheat zone the reaction shifted to reducing and carburizing with the maximum carburizing potential being at an exhaust temperature of about 840° F.

Rock bit segments made of NE 8620 steel were treated in this last mentioned fluid mixture having 1 to 1½ cfh methane flowing through the furnace, while maintaining the temperature within the furnace at about 1,700° F., and the temperature of the exhaust gases at about 840° F., were carburized to a carbon content of 0.94% to a depth of 0.080 inch. Testing the segments in a laboratory bearing testing machine showed the wearing surfaces to hold up for 16–18 hours with 0.010 to 0.020 inch wear before final failure of the carburized surfaces.

Rock bit segments made of NE 8620 steel were given the same treatment in the presence of the conventional endothermic type of atmosphere of Table VII held up only 12–14 hours with 0.010 to 0.020 inch wear before final failure of the carburized surfaces.

EXAMPLE II

In this example a study was made of the effect of the saturated fluid mixture on the non-metallic inclusions contained within the steel of EXample 1. These non-metallic inclusions were of the oxide and silicate type and had ratings of approximately No. 3 to No. 4 on the A.S.T.M. rating chart prior to heat treatment. After treatment in the saturated fluid mixture as explained in Example 1 samples of the treated steel under the microscope showed a reduction of these non-metallic inclusions bringing the A.S.T.M. ratings up to No. 1 to No. 2.

The same steels when given the same treatment in the presence of the conventional endothermic type of atmosphere of Table VII showed no change in the size, shape, or number of the non-metallic inclusions.

EXAMPLE III

In this example a saturated fluid mixture under the temperature and pressure conditions of Table II was discharged from a generator, such as illustrated in FIG. 1 and FIG. 2, through a controlling flow valve into a specially built preheating chamber attached to a standard box type of furnace being controlled at 1,550° F. In this example, the gases used in saturating the liquid water was air from a central air compressor storage at about 120 psia combined with a synthetic mixture of hydrocarbon gases composed mainly of methane and propane.

Both the air and the hydrocarbon gases through regulators common in the art, and had their pressures adjusted and balanced to apply a head pressure of 44 psia to the generator. The saturated fluid mixture flowed from the generator through a flow controlled valve, into the preheated chamber, and into the treating zone and out through an exhaust in which was placed a thermocouple to measure the heat content, or the energy level of generated environment. With the furnace controlled at a temperature of 1,550° F. and showing an exhaust temperature of 425° F. the following samples were tested:

1. Shim stock 0.010inch thick — for carbon potential determinations.
2. Pure iron with less than 0.02% contained carbon
3. S.A.E. 1018 — a low carbon steel
4. S.A.E. 4340 — a medium carbon, high alloy steel
5. S.A.E. 52100 a high carbon tool steel.

The samples were run for two hours in the furnace and pulled with tongs and water quenched. The results of the tests on these samples showed the fluid mixture under the above conditions to be reducing and with controlled carburizing/decarburizing potential of 0.60% carbon.

EXAMPLE IV

In this example, vanadium oxide ore containing 41.98% oxygen was run in the manner explained in Example III with the exception that the time in the furnace was for 12 hours. In this treatment the non-metallic ore was reduced by approximately 98.0% of the contained oxygen. The sample was found to be clean and free of all soot.

The same non-metallic ore run in the same manner in presence of the conventional endothermic type of atmosphere of Table VII was found to have been reduced only 24.6% and with a pick-up of carbon soot.

EXAMPLE V

In this example pure tungsten powder of 99.98% purity was converted to tungsten carbide when treated in a furnace in the presence of the saturated fluid mixture of Table IV. The powder was exposed for a period of 18 hours to the furnace temperature controlled at 1,880° F. The saturated fluid mixture was generated in a generator, such as illustrated in FIG. 1 and FIG. 2. In this example, the gas used in saturating the liquid water was carbon dioxide and methane. The saturated fluid mixture, under control of the rate of flow, moved to a preheat coil located in the treating zone of the furnace, into the treating zone of the furnace, and out the exhaust in which was located a thermocouple to measure the heat content or energy level of the exhausting gases. With the exhaust running at 840° F. the gaseous mixture had a heat content of 50 Btu/cf.

Examination of the treated tungsten powder showed the material to be free of soot, and on analysis showed the tungsten to have been converted to a tungsten carbide containing 1.78% carbon.

The same tungsten run in the same manner in the presence of the conventional endothermic type of the atmosphere of Table VII was found to be sooted up without the formation of any tungsten carbide.

EXAMPLE VI

In this example, iron oxide ore containing 29.6% oxygen and ground to a particle size of 30 to 80 mesh was treated in a furnace controlled at a temperature of 1,700° F. with the exhaust gases controlled at 600° F. in the presence of the saturated fluid mixture of Table IV. After the ground ore was exposed for a period of 12 hours to the furnace temperature of 1,700° F. in the presence of the saturated fluid mixture, the furnace was cooled to below 800° F. with the exhaust gases still maintained at a temperature of 600° F. All controls were then shut off and the furnace system was allowed to cool to room temperature.

An examination of the furnace system showed no sooting with clean, reduced particles. Analysis of the particles indicated the oxygen content to be 1.3%. The treatment of the iron ore oxide in the saturated fluid mixture of Table IV had removed 95.8% of the oxygen in the iron oxide ore.

The same iron oxide ore was treated in the furnace under the same conditions as previously indicated in the presence of the endothermic type atmosphere of Table VII. After the test runs, the furnace system had a heavy soot deposit and the iron oxide ore contained 21.4% oxygen, or a removal of only 27.7% of the oxygen from it.

The foregoing examples are representative and similar results may be obtained when treating any of the elements of the Periodic Table and their alloys or their oxides, carbides, silicates, sulfides, sulphates, phosphates and carbonates.

It is apparent from the foregoing that the present invention is well suited and adapted to attain the objects and ends and has the features and advantages mentioned as well as other inherent therein.

While presently preferred embodiments and examples have been given for the purpose of disclosure, many changes may be made therein and the invention may be applied to many additional uses and materials to obtain desired properties in various materials which are within the spirit of the invention as defined by the scope of the appended claims.

What is claimed is:

1. A generator for generating a saturated fluid mixture comprising,
   a chamber,
   means for introducing liquid water into the chamber,
   means for introducing into the chamber gases from a source means selected from the group consisting of oxidizing and reducing gases for providing in the liquid water a mixture of carbon dioxide, hydrogen and carbon monoxide, and oxidizing and carburizing gases for providing in the liquid water a mixture of carbon dioxide, methane, hydrogen and carbon monoxide in said chamber,
   said means arranged with respect to one another to bring the gas mixture into intimate contact with the water,
   means responsive to temperature of the water for maintaining the temperature of the water at a control point temperature from about 32° F. to about 160° F.,
   pressure regulator means for maintaining the pressure on any given gas mixture within the chamber at pressures from atmospheric up to 218.5 atmospheres, thereby generating the saturated fluid mixture, and
   outlet means in the chamber for discharge of the generated saturated fluid mixture comprising a plurality of outlets, said outlets being of a sufficiently small diameter to retain the properties of the generated saturated fluid mixture upon discharge from the chamber.

2. A generator for generating a saturated fluid mixture comprising,
   a first chamber,
   input means for introducing liquid water into the first chamber,
   pressure regulator input means for introducing gases from a source means into the first chamber so that it will bubble up through the liquid water therein, said gases selected from the group consisting of oxidizing and reducing gases for providing in the liquid water a mixture of carbon dioxide, hydrogen and carbon monoxide, and oxidizing and carburizing gases for providing in the liquid water a mixture of carbon dioxide, methane, hydrogen and carbon monoxide in said camber,
   first back pressure relief means at the upper end of the first chamber,
   a second chamber,
   valved conduit means connecting the first chamber and the second chamber for flow of the liquid water and any given gas mixture from the first chamber into the second chamber,
   means in the second chamber for maintaining the temperature of the liquid water at a control point temperature from about 32° F. to about 160° F.,
   second back pressure relief means at the upper end of the second chamber, and
   valved discharge means connected beneath the upper level of the liquid water in the second chamber for discharging the generated saturated fluid mixture from the second chamber,
   the pressure regulator input means and the first and second back pressure relief means arranged to maintain a pressure relief means arranged to maintain a pressure head on any given gas mixture in the upper end of the second chamber at pressures from ambient atmospheric up to 218.5 atmospheres.

3. A generator for generating a saturated fluid mixture comprising,
   a chamber,
   means for introducing liquid water into the chamber,
   source means for gases of a gas mixture selected from the group consisting of oxidizing and reducing gases for providing in the liquid water a mixture of carbon dioxide, hydrogen and carbon monoxide, and oxidizing and carburizing gases for providing in the liquid water a mixture of carbon dioxide, methane, hydrogen and carbon monoxide,
   gas inlet means in the chamber communicating with the source means for introducing the gases of the selected gas mixture into the chamber and into intimate contact with the water,
   means responsive to temperature of the water for maintaining the temperature of the water at a control point temperature from about 32° F. to about 160° F.,
   pressure regulator means for maintaining the pressure on any given gas mixture within the chamber of pressures from atmospheric up to 218.5 atmospheres, and
   outlet means in the chamber for discharge of the generated saturated fluid mixture retaining the properties of the generated saturated fluid mixture upon discharge from the chamber.

4. The generator of claim 3 where the outlet means comprises,
   a plurality of outlets, said outlets being of a sufficiently small diameter to retain the properties of the generated saturated fluid mixture upon discharge from the chamber.

5. The gas generator of claim 3 including,
   means for circulating the water from and to the chamber.

6. The generator of claim 3 including,
   back pressure relief means at the upper end of the chamber arranged to bleed off pressures above a predetermined pressure,
   pressure control means in the means for introducing into the chamber the gases of the gas mixture arranged to adjust the flow of the gas mixture into the chamber whereby a pressure head is formed and maintained within the chamber at its upper end, and
   means controlling the inflow of water into the chamber.

7. A generator for generating a saturated fluid mixture comprising, a first chamber, input means for introducing liquid water into the first chamber, source means for gases of a gas mixture selected from the group consisting of oxidizing and reducing gases for providing in the liquid water a mixture of carbon dioxide, hydrogen and carbon monoxide, and oxidizing and carburizing gases for providing in the liquid water a mixture of carbon dioxide, methane, hydrogen and carbon monoxide, pressure regulator input means for introducing the gases of the selected gas mixture into the first chamber in intimate contact with the water, first back pressure relief means at the upper end of the first chamber, a second chamber, valved conduit means connecting the first chamber and the second chamber for flow of the liquid water and the any given gas mixture from the first chamber into the second chamber, means in the second chamber for maintaining the temperature of the liquid water at a control point temperature from about 32° F. to about 160° F., second back pressure relief means at the upper end of the second chamber, and valved discharge means connected beneath the upper level of the liquid water in the second chamber for discharging the generated saturated fluid mixture from the second chamber, the pressure regulator input means and the first and second back pressure relief means arranged to maintain a pressure head on any given gas mixture in the upper end of the second chamber at pressures from ambient atmospheric up to 218.5 atmospheres.

* * * * *